United States Patent
Lucidarme et al.

(10) Patent No.: US 6,675,016 B2
(45) Date of Patent: Jan. 6, 2004

(54) METHOD FOR TRANSMITTING RADIO SIGNALS, RADIO COMMUNICATION ACCESS NETWORK AND TERMINAL USING SAME

(75) Inventors: Thierry Lucidarme, Montigny-le-Bretonneux (FR); Pierre Lescuyer, Montigny-le-Bretonneux (FR)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 10/220,754

(22) PCT Filed: Mar. 13, 2001

(86) PCT No.: PCT/FR01/00742

§ 371 (c)(1), (2), (4) Date: Sep. 3, 2002

(87) PCT Pub. No.: WO01/69952

PCT Pub. Date: Sep. 20, 2001

(65) Prior Publication Data

US 2003/0040320 A1 Feb. 27, 2003

(30) Foreign Application Priority Data

Mar. 15, 2000 (FR) .............................................. 00 3308

(51) Int. Cl.⁷ ................................................ H04Q 7/20
(52) U.S. Cl. ............................... 455/452.2; 455/67.13; 370/342; 375/144
(58) Field of Search .......................... 455/452.1, 452.2, 455/464, 63.1, 67.13, 114.2, 115.1, 296; 370/328, 329, 335, 338, 342, 347, 348, 468; 375/144, 285, 296

(56) References Cited

U.S. PATENT DOCUMENTS

| 6,009,330 A | 12/1999 | Kennedy, III et al. ...... 455/445 |
| 6,134,220 A | 10/2000 | Le Strat et al. ............. 370/252 |
| 6,307,867 B1 * | 10/2001 | Roobol et al. ............... 370/470 |
| 6,374,112 B1 * | 4/2002 | Widegren et al. ......... 455/452.2 |
| 6,501,748 B1 * | 12/2002 | Belaiche ..................... 370/342 |
| 2001/0008542 A1 * | 7/2001 | Wiebke et al. .............. 375/141 |
| 2003/0053440 A1 * | 3/2003 | Gruhn et al. ............... 370/349 |

FOREIGN PATENT DOCUMENTS

| EP | 0 969 682 | 1/2000 |
| EP | 0 986 206 | 3/2000 |
| EP | 1 021 053 | 7/2000 |
| FR | 2 782 429 | 2/2000 |
| WO | WO 98 03030 | 1/1998 |
| WO | WO 00 11648 | 3/2000 |

* cited by examiner

Primary Examiner—Nguyen T. Vo
Assistant Examiner—Thuan T. Nguyen
(74) Attorney, Agent, or Firm—Piper Rudnick LLP (57) ABSTRACT

The invention concerns a method wherein a radio link control stage processes separately first data units containing information items of a specific type and second data units not containing information items of said type. A control stage for access to the media delivers the first data units through a first dedicated transport channel and the second data units through a second dedicated transport channel. The data units delivered through said dedicated transport channels are supplied to an encoding and multiplexing stage to form at least a train of symbols relative to a dedicated physical channel and supplied to a radio transmission stage. The encoding and multiplexing stage and/or the radio transmission stage ensure greater protection against noise through the first dedicated transport channel than through the second dedicated transport channel.

39 Claims, 7 Drawing Sheets

METHOD FOR TRANSMITTING RADIO SIGNALS, RADIO COMMUNICATION ACCESS NETWORK AND TERMINAL USING SAME

BACKGROUND OF THE INVENTION

The present invention relates to the field of radio communications, and in particular to the techniques making it possible to form various types of dedicated channels for transmitting radio signals destined for a given station.

The invention finds application in particular in third-generation cellular networks of the UMTS type ("Universal Mobile Telecommunication System") using code-division multiple access (CDMA) techniques.

The fact that the dedicated signaling information and the traffic (voice or data) are transmitted over the radio interface with the same degree of immunity to noise is a limitation of certain radio communication systems. The radio coverage must be at least as great for the signaling as for the traffic. Otherwise, undesirable situations may occur, such as the inability of a subscriber to put an end to a communication in progress, or the inability to execute a cell transfer ("handover"), etc.

Furthermore, in certain cases, such as for example when an adaptive multi-rate (AMR) codec is used to code speech, the immunity to noise may be enhanced by increasing the redundancy introduced by the channel coding and by correspondingly reducing the instantaneous bit rate of the source coder. In such cases, it is also desirable to be able to increase the noise immunity of the dedicated signaling.

U.S. Pat. No. 5,230,082 tackles the above problem, as regards the risk of inability to execute a handover when it is no longer possible for a mobile terminal to pick up the signaling information controlling such handover. The document proposes a mechanism through which a base station neighboring the one which was previously serving the mobile terminal borrows the physical communication resource to deliver the handover command to the terminal. This mechanism lacks flexibility and requires cooperation between the base stations as well as a dynamic scheme for radio resource allocation in the network infrastructure.

Moreover, a user data flow can contain control information mixed with the traffic, in particular control information from the higher layers of the OSI model (network, transport or application). Here again, it may be sensible to protect the control or signaling information more than the traffic data, which is not allowed by the current systems.

An object of the present invention is to propose a method meeting the above requirements.

SUMMARY OF THE INVENTION

The invention thus proposes a method of transmitting radio signals based on at least one data flow toward a radio communication station, comprising the steps of:

processing separately, in a radio link control stage first data units containing information of a specified type and second data units not containing information of the specified type;

supplying the data units to a medium access control stage which delivers the first data units along a first dedicated transport channel and the second data units along at least one second dedicated transport channel;

supplying the data units delivered along said dedicated transport channels to a coding and multiplexing stage to form at least one symbol stream pertaining to a dedicated physical channel; and supplying each symbol stream to a radio transmission stage, and wherein the coding and multiplexing stage and/or the radio transmission stage are controlled to provide greater protection against noise along the first dedicated transport channel than along the second dedicated transport channel.

The information of said specified type is preferably information pertaining to a signaling protocol, whereas the "second data units" rather contain user data.

Several processes may be used to differentiate between the anti-noise protections afforded to the various transport channels. The coding and multiplexing stage can thus be controlled to apply a channel coding exhibiting a higher redundancy in the first dedicated transport channel than in the second dedicated transport channel.

In an advantageous embodiment, the coding and multiplexing stage is controlled to form a first symbol stream relating to a first dedicated physical channel based on the first dedicated transport channel, and at least one second symbol stream relating to a second dedicated physical channel based on at least one second dedicated transport channel.

Thus, the radio transmission stage can be so controlled that the radio signals transmitted have a first component along the first dedicated physical channel and a second component along the second dedicated physical channel, and that the first component has a greater transmission power than the second component. Another possibility, when the dedicated physical channels are multiplexed by a spread spectrum technique, is to control the coding and multiplexing stage and the radio transmission stage so that the first symbol stream has a smaller symbol bit rate than the second symbol stream, and that the first dedicated physical channel is associated with a higher spreading factor than the second dedicated physical channel.

Yet another possibility is to take advantage of the multiple receivers provided in certain radio communication terminals, especially when operated in macrodiversity mode, i.e. when the terminal communicates simultaneously with a plurality of base stations (see WO 00/38642). In the latter case, the radio signals can be transmitted from at least two base stations, the radio transmission stage being apportioned among said base stations, while arranging for the first and second symbol streams to be supplied to the radio transmission stage in distinct base stations, so as to form radio signals transmitted along different propagation paths.

In one embodiment of the method, the radio link control stage separately receives a first data flow belonging to a control plane, from which it forms the first data units, and at least one second data flow belonging to a user plane, from which it forms some at least of the second data units. The information of the specified type may then comprise radio resources control information and/or mobility management information and/or call control information.

In another embodiment, the radio link control stage receives a data flow belonging to a user plane, from which it forms the data units, while discriminating the first and second data units based on an analysis of said flow.

Other aspects of the present invention relate to an access network for a radio communication system and to a radio communication terminal, which comprise a radio link control stage, a medium access control stage, a coding and multiplexing stage and a radio transmission stage, which are arranged to implement a method of transmitting radio signals as defined hereinabove.

DESCRIPTION OF THE PREFERRED EMBODIMENT

Figure 1:
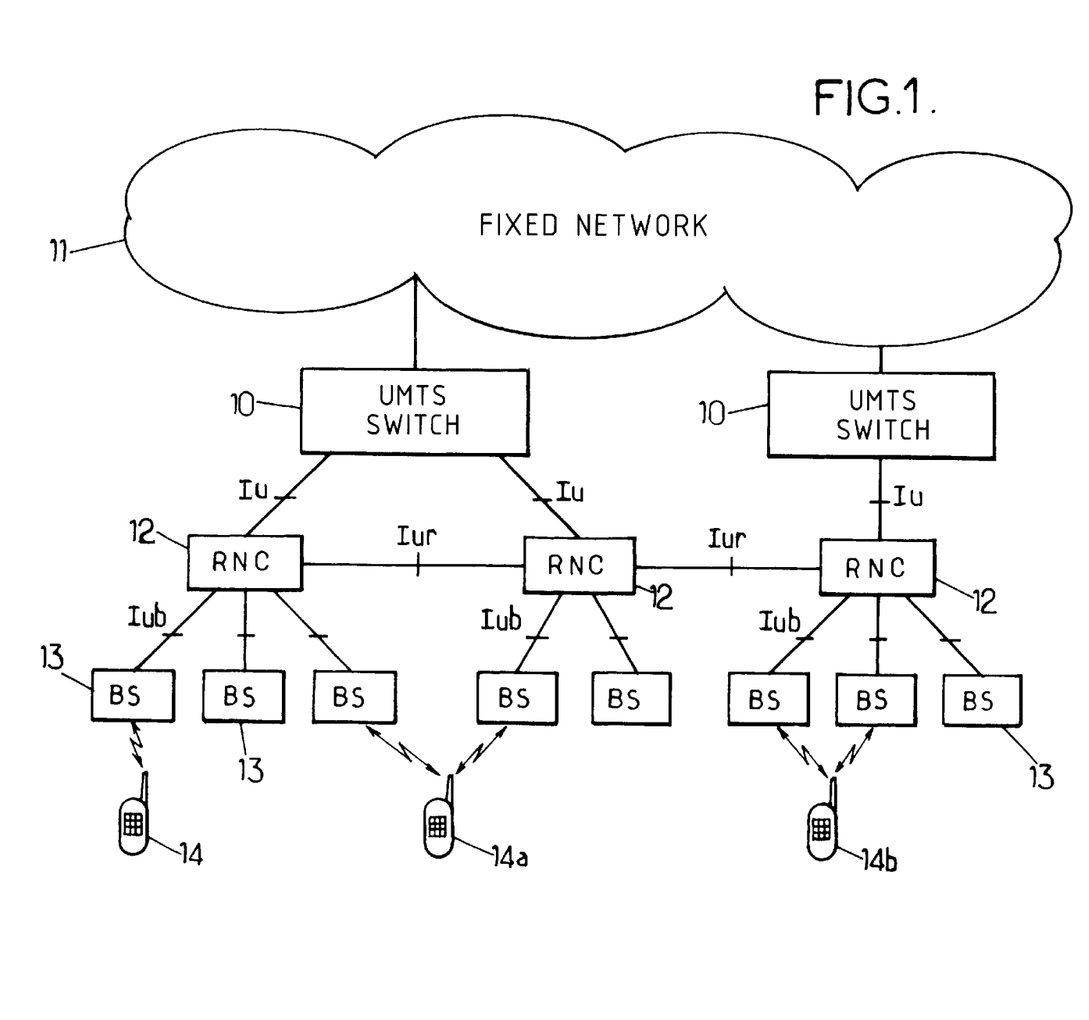
FIG. 1 is a diagram of a UMTS network to which the invention may be applied.

The invention is described below in its application to a UMTS network operating in FDD (frequency division duplex) mode. FIG. 1 shows the architecture of such a UMTS network.

The mobile service switches 10, belonging to a core network (CN), are linked on the one hand to one or more fixed networks 11 and on the other hand, by means of a so-called Iu interface, to control equipment 12 or RNCs ("Radio Network Controllers"). Each RNC 12 is linked to one or more base stations 13 by means of a so-called Iub interface. The base stations 13, distributed over the territory covered by the network, are capable of communicating by radio with the mobile terminals 14, 14a, 14b called UE ("UMTS Equipment"). The base stations can be grouped together to form nodes called "node B". Certain RNCs 12 may further communicate with one another by means of a so-called Iur interface. The RNCs and the base stations form an access network called UTRAN ("UMTS Terrestrial Radio Access Network").

The UTRAN comprises elements of layers 1 and 2 of the OSI model for providing the links-required on the radio interface (called Uu), and a radio resource control (RRC) stage 15A belonging to layer 3, as described in the 3G TS 25.301 technical specification "Radio Interface Protocol" version 3.2.0 published in October 1999 by the 3GPP (3$^{rd}$ Generation Partnership Project). Seen from the higher layers, the UTRAN acts simply as a relay between the UE and the CN.

Figure 2:
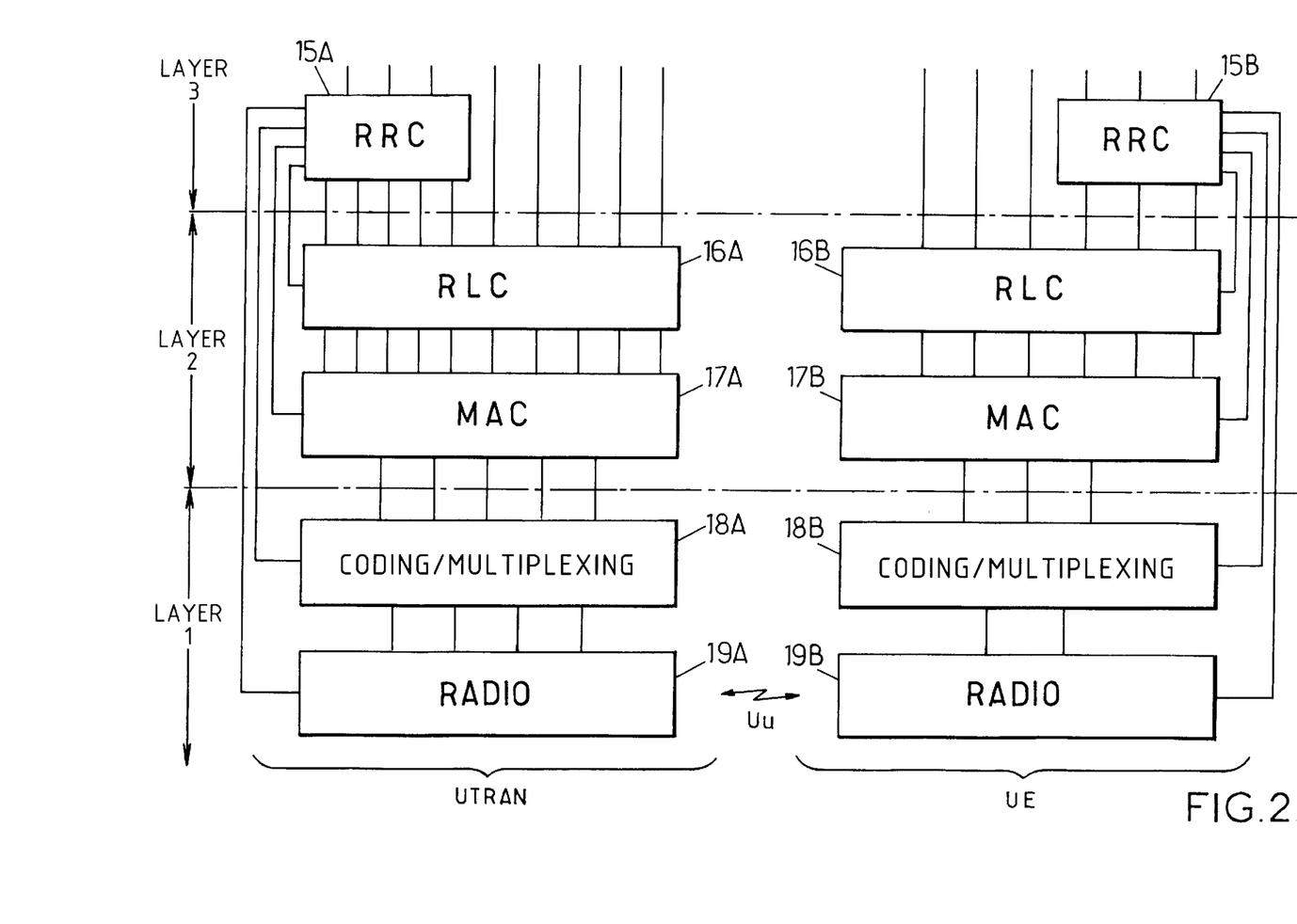
FIG. 2 is a chart showing the layer organization of communication protocols employed on the radio interface of the UMTS network.

FIG. 2 shows the RRC stages 15A, 15B and the lower layer stages which belong to the UTRAN and to a UE. On each side, layer 2 is subdivided into a radio link control (RLC) stage 16A, 16B and a medium access control (MAC) stage 17A, 17B. Layer 1 comprises a coding and multiplexing stage 18A, 18B. A radio stage 19A, 19B caters for the transmission of the radio signals from symbol streams provided by stage 18A, 18B, and the reception of the signals in the other direction.

There are various ways of adapting the architecture of protocols according to FIG. 2 to the hardware architecture of the UTRAN according to FIG. 1, and in general various organizations can be adopted depending on the types of channels (see section 11.2 of the 3G TS 25.401 technical specification "UTRAN Overall Description", version 3.1.0 published in January 2000 by the 3GPP). The RRC, RLC and MAC-stages are located in the RNC 12. When several RNCs are involved, the MAC sublayer can be apportioned among these RNCs, with appropriate protocols for the exchanges on the Iur interface, for example ATM ("Asynchronous Transfer Mode") and AAL2 ("ATM Adaptation Layer No. 2"). These same protocols may also be employed on the Iub interface for the exchanges between the MAC sublayer and layer 1. During exchanges in macrodiversity mode, an RNC can include part of layer 1, involved in macrodiversity functions.

Layers 1 and 2 are each controlled by the RRC sublayer, whose features are described in the 3G TS 25.331 technical specification "RRC Protocol Specification", version 3.1.0 published in October 1999 by the 3GPP. The RRC stage 15A, 15B supervises the radio interface. Moreover, it processes flows to be transmitted to the remote station according to a "control plane", as opposed to the "user plane" which corresponds to the processing of the user data arising from layer 3.

The RLC sublayer is described in the 3G TS 25.322 technical specification "RLC Protocol Specification", version 3.1.2 published in October 1999 by the 3GPP. In the transmit direction, the RLC stage 16A, 16B receives, according to the respective logical channels, data flows consisting of service data units (RLC-SDU) arising from layer 3. An RLC module of stage 16A, 16B is associated with each logical channel so as in particular to perform a segmentation of the RLC-SDU units of the flow into protocol data units (RLC-PDU) addressed to the MAC sublayer and comprising an optional RLC header. In the receive direction, an RLC module conversely performs a reassembling of the RLC-SDU units of the logical channel from the data units received from the MAC sublayer.

The MAC sublayer is described in the 3G TS 25.321 technical specification "MAC Protocol Specification", version 3.1.0 published in October 1999 by the 3GPP. It maps one or more logical channels onto one or more transport channels (TrCH). In the transmit direction, the MAC stage 17A, 17B can multiplex one or more logical channels into one transport channel. On such a transport channel, the MAC stage 17A, 17B delivers successive transport blocks TrBk each consisting of an optional MAC header and an RLC-PDU unit arising from an associated logical channel.

For each TrCH, the RRC sublayer provides the MAC sublayer with a transport format set (TFS). A transport format comprises a transmission time interval (TTI) equal to 10, 20, 40 or 80 ms, a transport block size, a transport block set size and parameters defining the protection scheme to be applied in the TrCH by layer 1 for detecting and correcting transmission errors. Depending on the current bit rate on the logical channel or channels associated with the TrCH, the MAC stage 17A, 17B selects a transport format from the TFS assigned by the RRC sublayer, and it delivers in each TTI a set of transport blocks complying with the selected format, whilst indicating this format to layer 1.

Layer 1 can multiplex several TrCHs on a given physical channel. In this case, the RRC sublayer assigns a transport format combination set (TFCS) to the physical channel, and the MAC sublayer dynamically selects a combination of transport formats from this TFCS, thereby defining the transport formats to be used in the various multiplexed TrCHs.

UMTS uses the spread spectrum CDMA technique, i.e. the transmitted symbols are multiplied by spreading codes consisting of samples called "chips" whose rate (3.84 Mchip/s in the case of UMTS) is greater than that of the symbols transmitted. The spreading codes distinguish various physical channels PhCH which are superimposed on the same transmission resource consisting of a carrier frequency. The auto- and cross-correlation properties of the spreading codes enable the receiver to separate the PhCHs and to extract the symbols intended therefor. For UMTS in FDD mode on the downlink, a scrambling code is allocated to each base station, and various physical channels used by this base station are distinguished by mutually orthogonal channel codes ("channelization codes"). The base station can also use several mutually orthogonal scrambling codes. On the uplink, the base station uses the scrambling code to separate the transmitting UEs, and possibly the channel code to separate the physical channels arising from one and the same UE. For each PhCH, the overall spreading code is the product of the channel code and the scrambling code. The spreading factor (equal to the ratio of the chip rate to the symbol rate) is a power of 2 lying between 4 and 512. This factor is chosen as a function of the bit rate of symbols to be transmitted on the PhCH.

The various physical channels are organized in 10 ms frames which follow one another on the carrier frequency used by the base station. Each frame is subdivided into 15 time slots of 666 $\mu$s. Each slot can carry the superimposed contributions of one or more physical channels, comprising common channels and dedicated physical channels (DPCH). The contribution from a DPCH to a time slot in FDD mode comprises:
- a number of pilot symbols placed at the end of the slot. Known a priori to the recipient, these symbols allow the recipient to acquire synchronization and to estimate parameters useful for demodulating the signal;
- a transport format combination indicator (TFCI), placed at the start of the slot; this TFCI arises from the MAC sublayer;
- a transmit power control (TPC) information to be used by the recipient on the reverse link; this command arises from a layer 1 power control module which uses servo-control parameters arising from the RRC sublayer;
- two data fields, denoted DATA1 and DATA2, placed on either side of the TPC field.

The DPCH can thus be viewed as including a dedicated physical control channel, or DPCCH, corresponding to the TFCI, TPC and PL fields, and a dedicated physical data channel, or DPDCH, corresponding to the DATA1 and DATA2 fields.

For one and the same communication, it is possible to establish several DPCHs corresponding to different channel codes, whose spreading factors may be equal or different. This situation is encountered in particular when a DPDCH is not sufficient to provide the transmission bit rate required by the application. In what follows, Y denotes the number, equal to or greater than 1, of physical channels used for one and the same communication in one direction.

Furthermore, this same communication can use one or more transport channels. Multiplexed TrCHs are for example used for multimedia transmissions, in which signals of different kinds to be transmitted simultaneously require different transport characteristics, especially as regards protection against transmission errors. Moreover, certain coders may deliver, in order to represent a given signal (e.g. audio), a plurality of symbol flows having different perceptual importances and therefore requiring different degrees of protection. Multiple TrCHs are then used to transport these various symbol flows. In what follows, X denotes the number, equal to or greater than 1, of transport channels used for a given communication on the aforesaid Y physical channels.

For each transport channel i ($1 \leq i \leq X$), the TTI is composed of $F_i$ consecutive frames, with $F_i=1$, 2, 4 or 8. Typically, the shorter the delay with which the signal conveyed by the transport channel must be received, the shorter is the TTI used. For example, a TTI of 10 ms ($F_i=1$) will be used for a telephony application, while a TTI of 80 ms ($F_i=8$) may be used for a data transmission application.

The coding and the multiplexing of the X flows of information symbols emanating from the TrCHs on the Y PhCHs are described in detail in the 3G TS 25.212 technical specification "Multiplexing and channel coding (FDD)", version 3.0.0 published in October 1999 by the 3GPP.

In the transmission direction, the stage 18A multiplexes the flows $a_i$ ($1 \leq i \leq X$) relating to the X TrCHs used in a communication, to form what is called a coded composite transport channel, or CCTrCH, which is subsequently subdivided into one or more physical channels PhCH#j ($1 \leq j \leq Y$) on which synchronized symbol flows, respectively denoted $r_j$, are transmitted.

Figure 3:
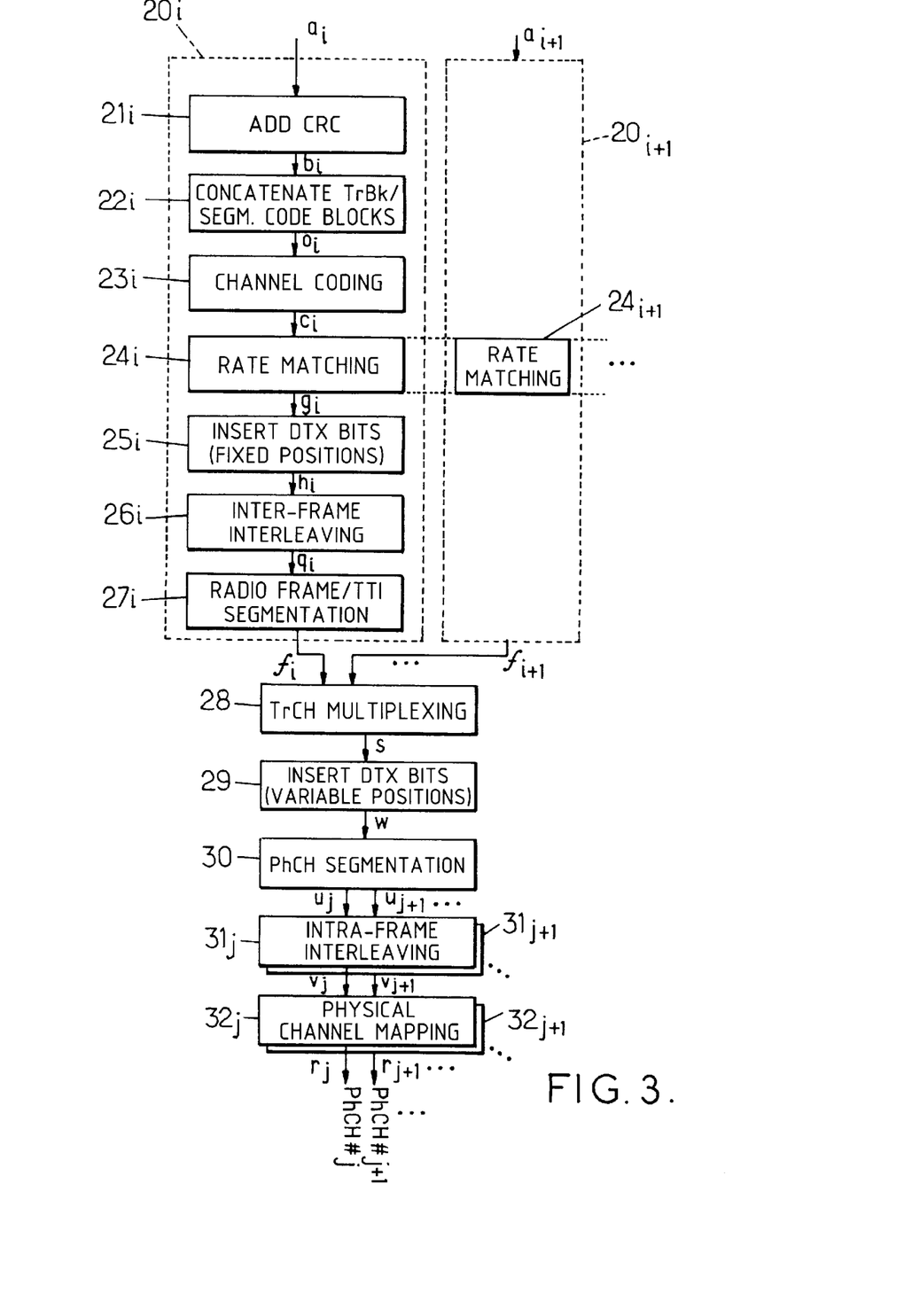
FIG. 3 is a schematic diagram of a coding and multiplexing stage of a base station of the network.

The coding and multiplexing stage 18A is described with reference to FIG. 3 in the direction of transmission from the UTRAN to a UE. A similar structure is provided for the uplink (see specification 3G TS 25.212). The references bearing the index i designate the elements pertaining to TrCH i ($1 \leq i \leq X$), the references bearing the index j designate the elements pertaining to PhCH j ($1 \leq j \leq Y$), and the references with no index pertain to the operations performed for each frame at the CCTrCH level.

The characteristics of the transport format are supplied to the coding block $20_i$ by the MAC stage 17A. The flow $a_i$ to be transmitted on each TRCH i is composed of successive TrBks. The module $21_i$ completes each TrBk by adding thereto a cyclic redundancy checksum (CRC), serving to detect any transmission errors. The TrBk $b_i$ are then concatenated and/or segmented by the module $22_i$ to form blocks $o_i$ of appropriate size for the input of the channel coder $23_i$.

For each TTI of transport channel i, the channel coder $23_i$ outputs a sequence $c_i$ of $E_i$ coded bits denoted $c_{i,m}$ ($1 \leq m \leq E_i$). Two types of error correcting code may be applied by the module $23_i$:
- a convolutional code of rate ½ or ⅓ and of constraint length K=9;
- a turbocode of rate ⅓ for the applications requiring the lowest error rates.

The rate matching modules $24_i$ delete (puncture) or repeat bits of the sequences $c_i$ so as to match the bit rate of the TrCHs to the global bit rate allowable on the PhCH or PhCHs given their spreading factors.

The parameters of the CRC, of the channel coding and of the rate matching are defined in the transport format.

In a given frame, the periods devoted to the various TrCHs of the communication may have fixed positions (before the intra-frame interleaving mentioned below) or variable positions. In the case of fixed positions, it may be necessary to append to the sequence $g_i$ delivered by the module $24_i$, by means of the module $25_i$, one or more marked symbols, called DTX ("Discontinuous Transmission") bits, which will not be transmitted.

The interleaving module $26_i$ performs a permutation of the sequence $h_i$ delivered by the module $25_i$, with a view to distributing the symbols pertaining to the TTI over the $F_i$ frames which it covers. This interleaving consists in writing the symbols of the sequence $h_i$ successively to the rows of a matrix comprising $F_i$ columns, in permuting the columns of the matrix, and in then reading the symbols of the matrix column by column to form the sequence denoted $q_i$. The module $27_i$ then chops the sequence $h_i$ into $F_i$ segments of consecutive symbols corresponding to the $F_i$ columns of the interleaving matrix after permutation, and respectively assigns these segments to the $F_i$ frames of the TTI to form a sequence denoted $f_i$ for each frame and each TrCH i ($1 \leq i \leq X$).

The sequences $f_i$ produced for the various TrCHs of the communication ($1 \leq i \leq X$) are multiplexed, i.e. placed one after the other, by a module 28 forming a sequence s of S symbols for the CCTrCH. In the case where the periods devoted to the various TrCHs of the communication have variable positions, it may be necessary to append to the sequence s, by means of the module 29, one or more DTX bits.

Then, the module 30 chops the sequence w delivered by the module 29 into Y segments of $U_1, U_2, \ldots, U_Y$ consecutive symbols, and respectively assigns these segments to the Y PhCHs to form a sequence denoted $u_j$ for each PhCH j ($1 \leq j \leq Y$). The interleaving module $31_j$ performs a permutation of the sequence $u_j$, with a view to distributing the symbols, within the current frame, over the Y PhCHs employed by the communication. This interleaving consists in writing the symbols of the sequence $u_j$ successively to the rows of a matrix comprising thirty columns, in permuting the columns of the matrix, and in then reading the symbols of the matrix column by column to form the sequence, denoted $v_j$, of $U_j$ symbols.

The physical channel mapping module $32_j$ finally distributes the successive symbols of the sequence $v_j$ into the fields DATA1 and DATA2 of the time slots of the current frame. The module $32_j$ further completes the symbol stream $r_j$ delivered by the stage 18A by inserting the appropriate signaling bits into the fields PL, TFCI and TPC of the DPCCH.

Figure 4:
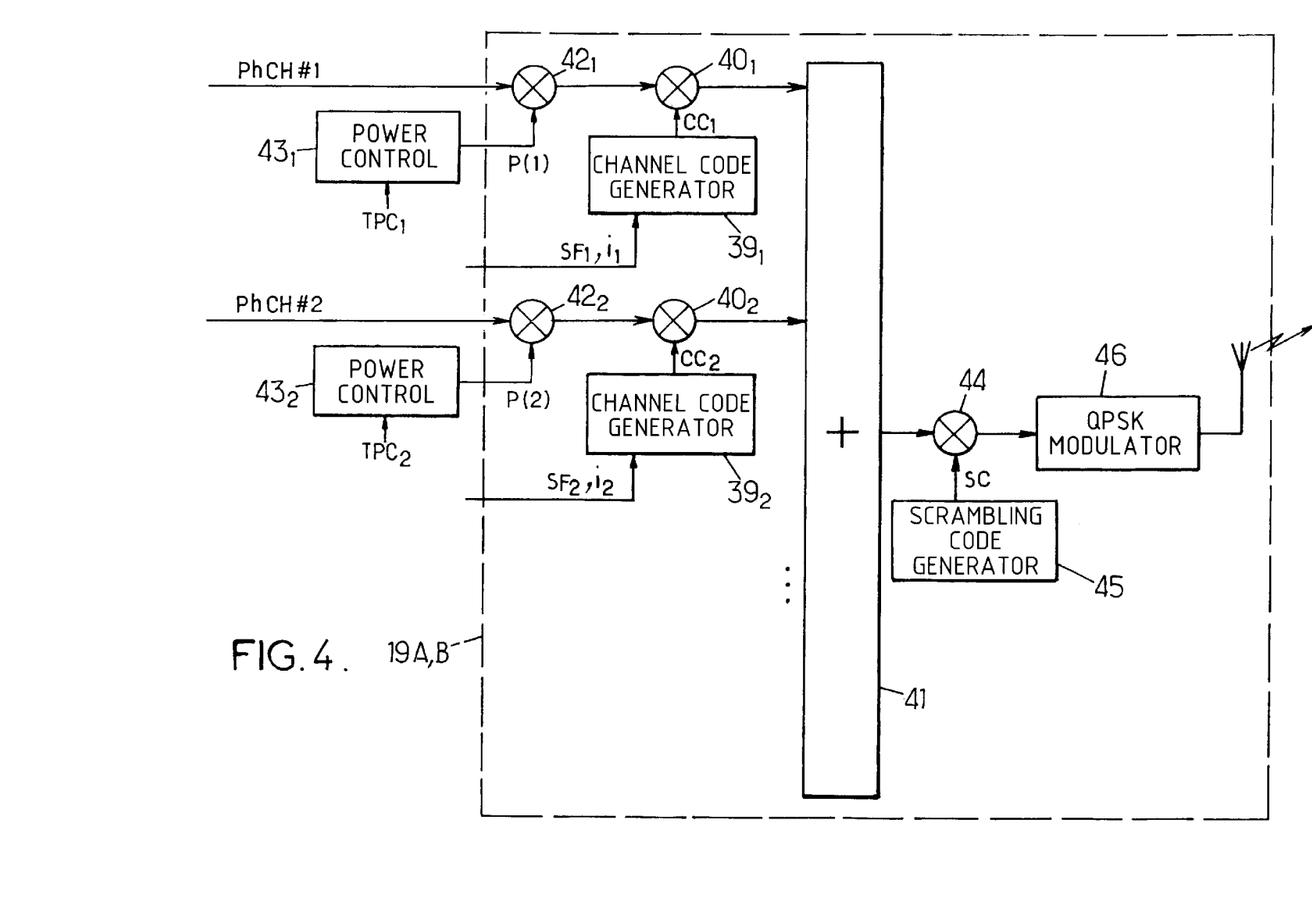
FIG. 4 is a schematic diagram of a radio transmission stage of the base station.

FIG. 4 illustrates the organization of the radio transmission stage 19A, 19B of a base station 13 or of a UE 14, which multiplexes the PhCHs by the CDMA technique. The information to be transmitted on a PhCH j forms the subject of a first spreading by the channel code $CC_j$.

Figure 5:
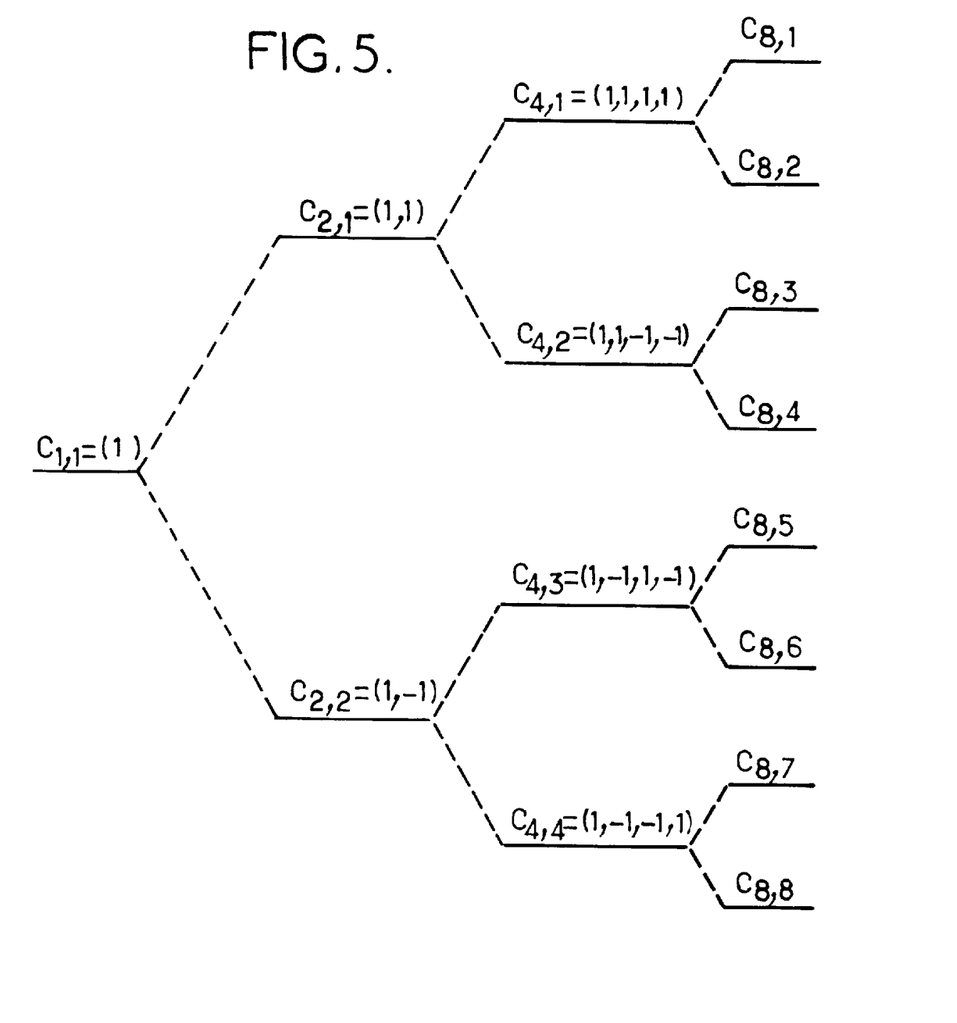
FIG. 5 is a chart illustrating a set of codes for separating channels usable in a cell of the network.

The channel codes $CC_j$ are orthogonal variable spreading factor (OVSF) codes. They are chosen from a set of codes of the same type as the tree represented in FIG. 5. Each code $c_{SF,i}$ ($1 \leq i \leq SF$) is a sequence of SF chips, each taking the value $\pm 1$, with $SF=2^{L-k}$, L being a positive integer (equal to 8 in the case of UMTS) and k an integer variable such that $0 \leq k \leq L$. The tree is defined by:

$$c_{1,1} = (1),$$

$$c_{2.SF, 2i-1} = (c_{SF,i}, c_{SF,i}),$$

$$c_{2.SF, 2i} = (c_{SF,i}, -c_{SF,i}),$$

The chips of a channel code $c_{SF,i}$ modulate, at the rate D=3.84 Mchip/s, symbol streams whose rate is $D/SF=2^{k-L}.D$, i.e. the spreading factor equals $SF=2^{L-k}$. The symbols in question are complex symbols each comprising two signed bits (of value $\pm 1$) corresponding to an I pathway and to a Q pathway.

The channel codes are allocated by the RRC sublayer. The codes allotted are chosen so as to be globally orthogonal for one transmitter. With the code tree of FIG. 5, two codes having the same spreading factor are always orthogonal, the sum of the chip-by-chip products being zero. Two codes with spreading factors $2^{L-k}$ and $2^{L-k'}$ are orthogonal if, after they have modulated any two sequences of signed bits with respective rates $2^{k-L}.D$ and $2^{k'-L}.D$, the resulting chip sequences are orthogonal. With the tree arrangement of FIG. 5, this amounts to saying that two channel codes are orthogonal if and only if they do not belong to one and the same branch of the tree, going from the root $c_{1,1}$ to a leaf $c_{L,i}$. The selection of the codes by the RRC sublayer obeys this constraint globally: the set of channel codes $CC_j$ used at the same instant by the transmitter is such that no two codes are found on the same branch. This allows the receivers to discriminate the channels which concern them.

The RRC sublayer supplies, for each PhCH j formed by the coding and multiplexing stage 18A, 18B, the spreading factor $SF_j$ and the index $i_j$ of the channel code to be used. A generator $39_j$ the stage 19A, 19B delivers this code $CC_j = c_{SFj,ij}$ to a multiplier $40_j$ which modulates the complex symbols transmitted on the corresponding physical channel. The symbol sequences thus modulated are summed at 41 so as to combine the multiple access channels.

Before the summator 41 (upstream or downstream of the multiplier $40_j$), another multiplier $42_j$ weights the contribution of each PhCH j by applying thereto a gain P(j) determined by a power control module $43_j$ as a function of commands $TPC_j$ returned in the DPCCH on the reverse link. These commands $TPC_j$ are obtained after estimation by the receiver of the signal-to-interferer ratio (SIR) and comparison with a target value $SIR_{target,j}$ given by the RRC sublayer, according to a servo-control procedure described in the 3G TS 25.214 technical specification "Physical layer procedures (FDD)", version 3.1.1 published in December 1999 by the 3GPP.

The complex signal delivered by the summator 41 is multiplied at 44 by the scrambling code SC supplied by a generator 45. The code SC is applied identically to all the CDMA channels, except in the case of a base station using several scrambling codes.

At the output of the multiplier 44, the complex baseband signal is processed by a modulator 46 carrying out the pulse shaping and a four-state phase modulation (QPSK) to form the radio signal transmitted on the Uu interface.

The reception part of the stage 19A, 19B transposes the radio signal picked up and amplified into baseband, then it multiplies it by the scrambling code and by the channel code $CC_j$ of each PhCH to be processed. The estimated symbol streams thus recovered are submitted to the stage 18A, 18B which undertakes the demultiplexing and decoding operations which are the dual of the operations described with reference to FIG. 3, thereby restoring the TrBks estimated in relation to the various TrCHs. When operating in macrodiversity mode, a combination of the TrBks estimated subsequent to reception along various routes is performed to achieve the macrodiversity gain. The MAC stage 17A, 17B next undertakes the logical channel demultiplexing from the transport channels, then the RLC stage 16A, 16B reassembles the data flows intended for the higher layers.

Figure 6:
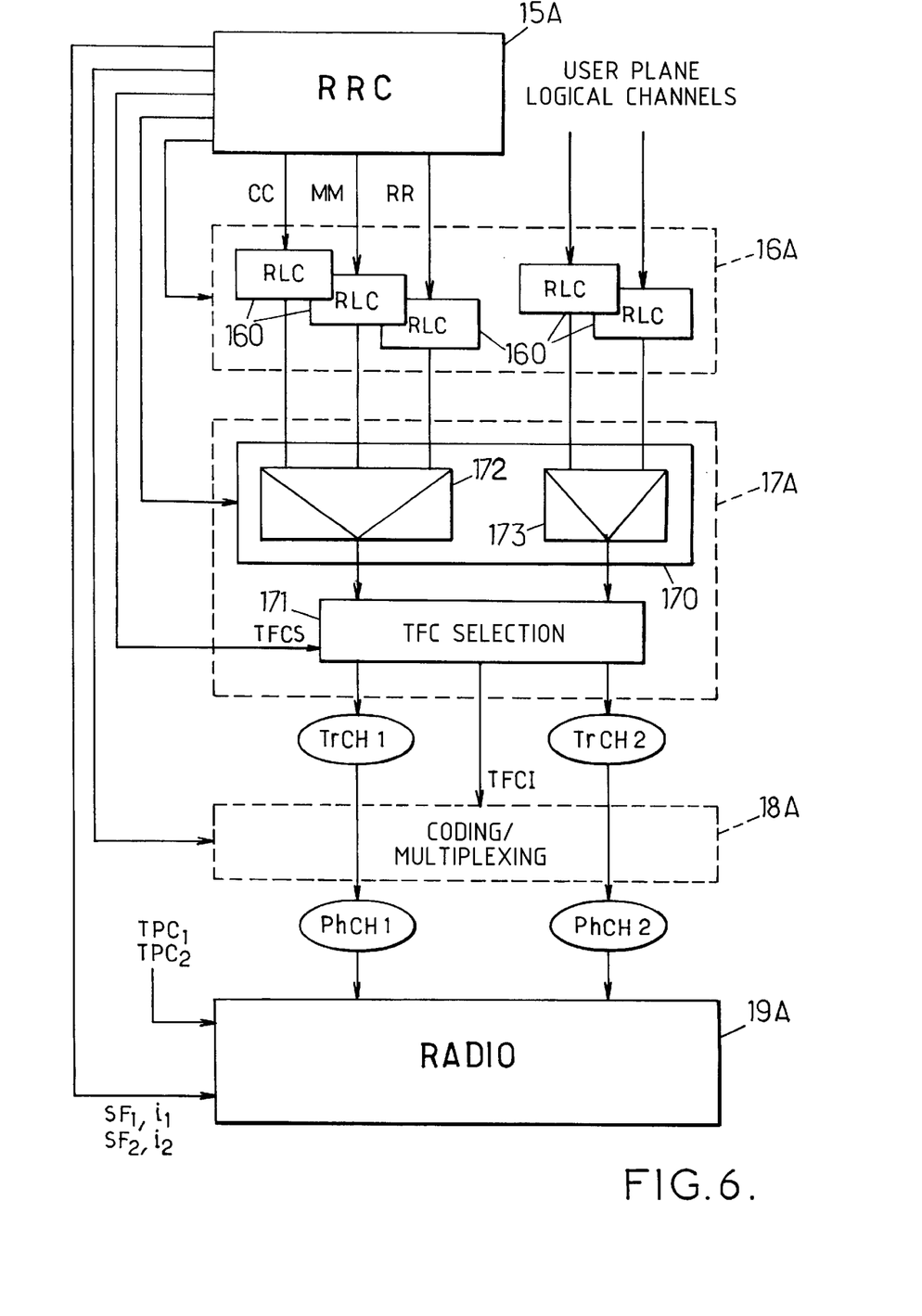
FIG. 6 is a partial schematic diagram of an exemplary access network according to the invention.

FIG. 6 diagrammatically shows UTRAN entities involved in accordance with an embodiment of the invention in the sending of dedicated information to a UE. It will be noted that an analogous organization can be adopted for the uplink. In the example represented, the control plane comprises three logical channels for the sending of call control information (CC), mobility management information (MM) and radio resources control information (RR), respectively, destined for the corresponding RRC entity of the UE, and the user plane comprises two logical channels for the sending of user information. The RRC stage 15A controls the RLC stage 16A to create an instance of RLC module 160 for each logical channel.

In addition to other functions, not shown, the MAC stage 17A comprises, for the dedicated channels relating to the relevant UE, a channel switching module 170 and a transport format combination selection module 171. As shown diagrammatically by the blocks 172, 173, the RRC stage controls the module 170 to multiplex the logical channels of the control plane on a first dedicated transport channel TrCH 1 and the logical channels of the user plane on a distinct dedicated transport channel TrCH 2. By observing the bit rates on the logical channels associated with the transport channels, the module 171 selects the appropriate transport format combination from among the TFCS supplied by the RRC stage 15A, and delivers the corresponding indication TFCI to layer 1.

The TFCS chosen by the RRC stage 15A can, for each combination, impose a higher redundancy on the channel coding applied to TrCH 1 than on that applied to TrCH 2. For example, the turbocode can be assigned to TrCH 1 while a convolutional code is assigned to TrCH 2. The differentiation may also be achieved at the rate matching and/or CRC level.

The RRC stage 15A further controls the coding and multiplexing stage 18A so that two physical channels (PhCH 1 and PhCH 2) are used to send the data respectively emanating from the two dedicated TrCHs. These two PhCHs j are linked to the radio stage 19A to which the RRC stage 15A supplies the parameters $SF_j, i_j$ of the channel codes to be used.

By providing distinct dedicated physical channels for the signaling information and the user data, it is possible to increase the robustness to noise of the signaling information while effectively managing the radio resources. The RRC sublayer can in particular allocate a higher spreading factor to PhCH 1 carrying the signaling information than to PhCH 2 carrying the user data, the latter channel having a higher symbol bit rate. By using a single PhCH, the sending of the same information would have required the allocation of a channel code of smaller spreading factor, i.e. closer to the root of the tree of FIG. 5, thereby mobilizing more code resource (for example, it may be seen in FIG. 5 that it is less effective to allocate the code $c_{2,1}$ to a single PhCH of higher global bit rate than to allocate the codes $c_{8,1}$ and $c_{4,2}$ respectively to the channels PhCH 1 and PhCH 2, thereby leaving the code $c_{8,2}$ available for another user).

If the base station is short of channel codes, it is possible to assign it a new scrambling code.

The RRC sublayer can control the enhanced robustness to noise in respect of the signaling information by adjusting the downlink target power control values $SIR_{target,1}$, $SIR_{target,2}$. With $SIR_{target,1} > SIR_{target,2}$, the servo-control achieves a higher transmission power on PhCH 1 than on PhCH 2, by way of the commands $TPC_1$ and $TPC_2$ returned on the uplink. Increasing the transmission power on PhCH 1 alone is better from the interference point of view than increasing the transmission power on a single PhCH that would carry the same amount of information.

Alternatively, or additionally, the RRC stage 15A of UTRAN can adjust the power levels of channels PhCH 1 and PhCH 2 directly rather than through the servo-control loop using the parameter $SIR_{target}$.

In macrodiversity mode, the radio signals are transmitted to the UE from at least two base stations 13. Layer 1 may be regarded as apportioned between these base stations (or node B). The serving RNC can control the enhanced robustness to noise in respect of the signaling information by directing the TrCH 1, and hence PhCH 1 to the base station with which the radio link is of better quality and the TrCH 2/PhCH 2 to another base station with which a link exists. The multiple receivers provided in the UE to support the macrodiversity mode are then used, relinquishing this mode, to receive the information along different propagation paths.

Figure 7:
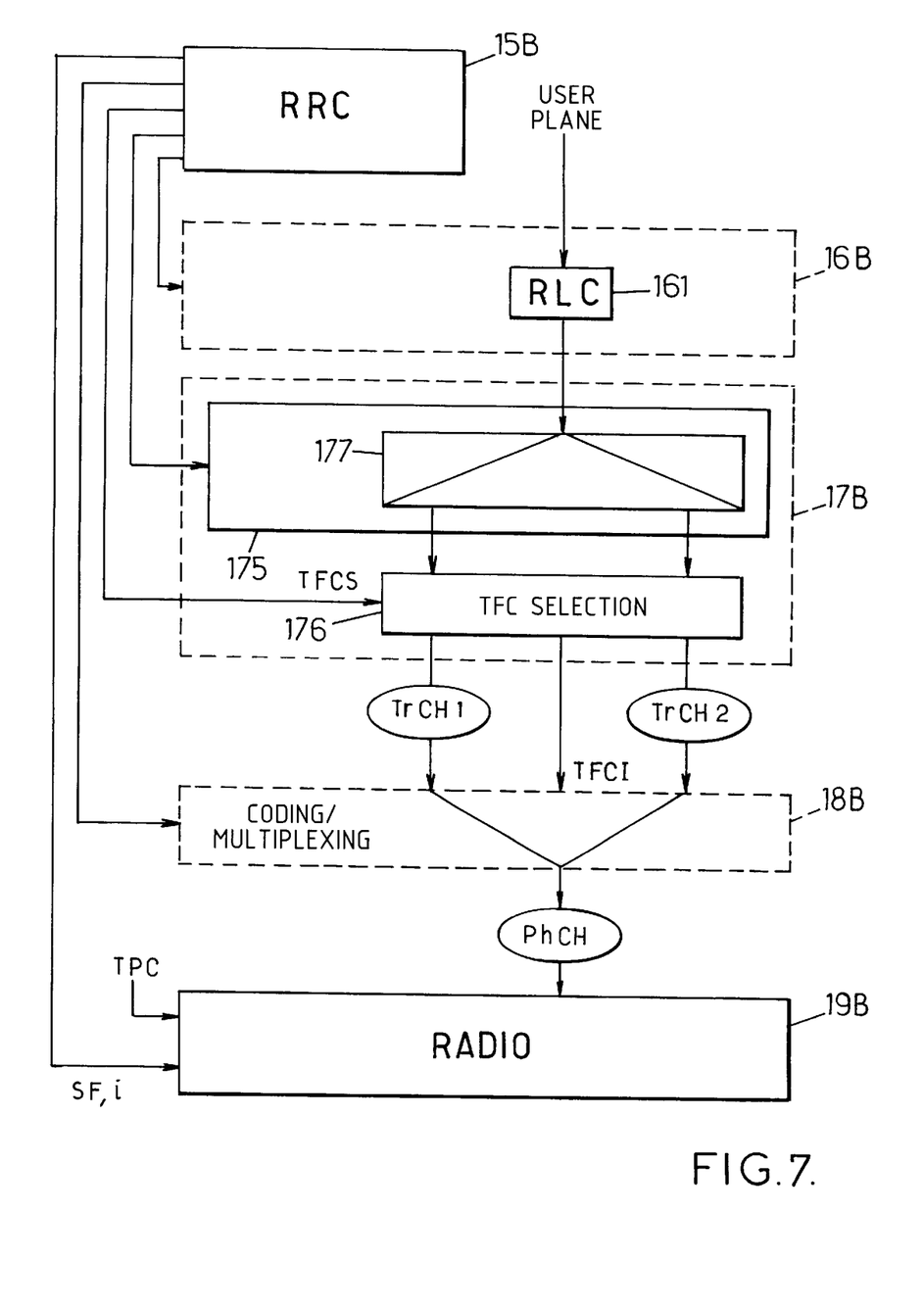
FIG. 7 is a partial schematic diagram of an exemplary radio communication terminal according to the invention.

FIG. 7 diagrammatically shows entities of the bottom layers of a UE involved in accordance with an embodiment of the invention in the sending of dedicated information to UTRAN. It will be noted that an analogous organization may be adopted for the downlink. To simplify the example, consideration is given to the processing of a single logical channel of the user plane, this logical channel receiving IP datagrams from layer 3. The datagram flow carries control information mixed with user data.

The RRC stage 15B controls the RLC stage 16B to create an instance of RLC module 161 for the logical channel, and so that this module 161 carries out a discrimination, at the moment of segmentation, between first data units RLC-PDU including information of a specified type (for example control) and second data units RLC-PDU not including information of the specified type. The module 161 analyzes the incident flow on the fly and signals the MAC sublayer as to which are the first and second RLC-PDU units, for example by means of a flag placed in the RLC header of each RLC-PDU unit, or by means of a parameter of a communication primitive between the two sublayers.

In addition to other functions, not shown, the MAC stage 17B comprises a channel switching module 175 and a transport format combination selection module 176. As shown diagrammatically by the block 177, the RRC stage controls the module 175 to separate the logical channel of the user plane into two distinct dedicated transport channels TrCH 1 and TrCH 2. TrCH 1 receives the first RLC-PDU units, while TrCH 2 receives the second RLC-PDU units. This separation is performed on the basis of the indications supplied by the module 161 with each RLC-PDU unit (header or primitive). By observing the bit rates on the two dedicated transport channels, the module 176 selects the appropriate transport format combination from among the TFCS supplied by the RRC stage 15B, and delivers the corresponding indication TFCI to layer 1.

The TFCS chosen by the RRC stage 15B can, for each combination, impose a higher redundancy on the channel coding applied to TrCH 1 than on that applied to TrCH 2. For example, the turbocode can be assigned to TrCH 1 while a convolutional code is assigned to TrCH 2. The differentiation may also be achieved at the rate matching and/or CRC level.

The RRC stage 15B further controls the coding and multiplexing stage 18B so that the two TrCHs are multiplexed on a single physical channel. This PhCH is linked to the radio stage 19B to which the RRC stage 15B supplies the parameters SF,i of the channel code to be used.

In the example of FIG. 7, where the dedicated transport channels are grouped onto one and the same physical channel, the differentiation of the immunity to noise results from the transport formats defined by the RRC sublayer and selected by the MAC sublayer. Of course, it would also be possible to use a process similar to what was described with reference to FIG. 6, using several PhCHs.

The analysis of the flow by the RLC sublayer comprises an examination of one or more headers contained in the IP datagrams, making it possible to identify the segmented data units which contain the desired information. The nature of this information may depend on the protocols used in the higher layers, on the applications supported, on choices of the cellular network operator, etc.

The discrimination can for example be based on:

the type of service field (TOS) of each IP datagram, in particular the so-called "reliability flag" thereby possibly helping to protect certain IP datagrams more than others. For a description of the IP headers, see "Internet Protocol", Request for Comments (RFC) 791 published by the Internet Engineering Task Force (IETF), September 1981;

the type of protocol field contained in the IP header of each datagram, thereby making it possible to protect control information such as that pertaining to the ICMP protocol ("Internet Control Message Protocol", RFC 792, IETF, September 1981) or RSVP protocol ("Resource ReSerVation Protocol (RSVP)", RFC 2205, IETF, September 1997) more than others transmitted according to protocols serving more especially for the transport of user data, such as UDP ("User Datagram Protocol", RFC 768, IETF, August 1980). It is thus possible to ensure that important information, such as indications of expiry of time to live (TTL) or of wrong destination address of certain datagrams, are routed under the best conditions over the radio interface;

a transport layer protocol header such as for TCP ("Transmission Control Protocol", RFC 793, IETF, September 1981). It is thus possible to ensure that important information of the transport protocol (for example acknowledgement or reset messages) are routed under the best conditions over the radio interface. TCP uses relatively long timeouts (a few seconds), so that the protection of this signaling information appreciably improves the effectiveness of the protocol;

an application layer protocol header. This makes it possible for example to favor network management applications (SNMP protocol, "A Simple Network Management Protocol (SNMP)", RFC 1157, IETF, May 1990) or file transfer applications (FTP protocol, "File Transfer Protocol (FTP)", RFC 959, IETF, October 1985) with respect to web browsing (HTTP protocol, "Hypertext Transfer Protocol", RFC 1945, IETF, May 1996). If TCP is used in layer 4, the indication of the application protocol may be found in the TCP header. If UDP is used in layer 4, the indication is found in the data part. Another example consists, within a real-time application such as telephony over IP, in favoring the control information as compared with the coded real-time signal, i.e. the RTCP protocol as compared with the RTP protocol (see "RTP: A Transport Protocol for Real-Time Applications", RFC 1889, IETF, January 1996).

What is claimed is:

1. A method of transmitting radio signals based on at least one data flow toward a radio communication station, comprising the steps of:

processing separately, in a radio link control stage, first data units containing information of a specified type and second data units not containing information of the specified type;

supplying the data units to a medium access control stage which delivers the first data units along a first dedicated transport channel and the second data units along at least one second dedicated transport channel;

supplying the data units delivered along said dedicated transport channels to a coding and multiplexing stage (18A, 18B) to form at least one symbol stream pertaining to a dedicated physical channel;

supplying each symbol stream to a radio transmission stage; and controlling the coding and multiplexing stage and/or the radio transmission stage to provide greater protection against noise along the first dedicated transport channel than along the second dedicated transport channel.

2. The method as claimed in claim 1, wherein the information of the specified type is information pertaining to a signaling protocol.

3. The method as claimed in claim 1, wherein the coding and multiplexing stage is controlled to apply a channel coding exhibiting a higher redundancy in the first dedicated transport channel than in the second dedicated transport channel.

4. The method as claimed in claim 1, wherein the coding and multiplexing stage is controlled to form a first symbol stream relating to a first dedicated physical channel based on the first dedicated transport channel, and at least one second symbol stream relating to a second dedicated physical channel based on at least one second dedicated transport channel.

5. The method as claimed in claim 4, wherein the radio transmission stage is so controlled that the transmitted radio signals have a first component along the first dedicated physical channel and a second component along the second dedicated physical channel, and that the first component has a greater transmission power than the second component.

6. The method as claimed in claim 4, wherein the dedicated physical channels are multiplexed by a spread spectrum technique, and wherein the coding and multiplexing stage and the radio transmission stage are so controlled that the first symbol stream has a smaller symbol bit rate than the second symbol stream, and that the first dedicated physical channel is associated with a higher spreading factor than the second dedicated physical channel.

7. The method as claimed in claim 4, wherein the radio signals are transmitted from at least two base stations, the radio transmission stage being apportioned among said base stations, and wherein the first and second symbol streams are supplied to the radio transmission stage in distinct base stations, so as to form radio signals transmitted along different propagation paths.

8. The method as claimed in claim 1, wherein the radio link control stage separately receives a first data flow belonging to a control plane, from which it forms the first data units, and at least one second data flow belonging to a user plane, from which it forms some at least of the second data units.

9. The method as claimed in claim 8, wherein the information of the specified type comprises radio resource control information and/or mobility management information and/or call control information.

10. The method as claimed in claim 1, wherein the radio link control stage receives a data flow belonging to a user plane, from which it forms the data units, while discriminating the first and second data units based on an analysis of said flow.

11. The method as claimed in claim 10, wherein said data flow is composed of IP datagrams.

12. The method as claimed in claim 11, wherein the analysis of the flow comprises an examination of a type of service field and/or of a type of protocol field included in a header of each IP datagram.

13. The method as claimed in claim 11, wherein the analysis of the flow comprises an examination of a transport layer protocol header and/or of an application layer protocol header included in each IP datagram.

14. An access network for a radio communication system, comprising a radio link control stage, a medium access control stage, a coding and multiplexing stage and a radio transmission stage, wherein the radio link control stage has means for processing separately first data units containing information of a specified type and second data units not containing information of the specified type, wherein the medium access control stage has means for receiving said data units and means for delivering the first data units along a first dedicated transport channel and the second data units along at least one second dedicated transport channel, wherein the coding and multiplexing stage has means for receiving the data units delivered along said dedicated transport channels and means for forming at least one symbol stream pertaining to a dedicated physical channel and supplied to the radio transmission stage, and wherein the coding and multiplexing stage and/or the radio transmission stage are controlled to provide greater protection against noise along the first dedicated transport channel than along the second dedicated transport channel.

15. The access network as claimed in claim 14, wherein the information of the specified type is information pertaining to a signaling protocol.

16. The access network as claimed in claim 14, wherein the coding and multiplexing stage is controlled to apply a channel coding exhibiting a higher redundancy in the first dedicated transport channel than in the second dedicated transport channel.

17. The access network as claimed in claim 14, wherein the coding and multiplexing stage is controlled to form a first symbol stream relating to a first dedicated physical channel based on the first dedicated transport channel, and at least one second symbol stream relating to a second dedicated physical channel based on at least one second dedicated transport channel.

18. The access network as claimed in claim 17, wherein the radio transmission stage is so controlled that the transmitted radio signals have a first component along the first dedicated physical channel and a second component along the second dedicated physical channel, and that the first component has a greater transmission power than the second component.

19. The access network as claimed in claim 17, wherein the dedicated physical channels are multiplexed by a spread spectrum technique, and wherein the coding and multiplexing stage and the radio transmission stage are so controlled that the first symbol stream has a smaller symbol bit rate than the second symbol stream, and that the first dedicated physical channel is associated with a higher spreading factor than the second dedicated physical channel.

20. The access network as claimed in claim 17, wherein the radio signals are transmitted from at least two base stations, the radio transmission stage being apportioned among said base stations, and wherein the first and second symbol streams are supplied to the radio transmission stage in distinct base stations, so as to form radio signals transmitted along different propagation paths.

21. The access network as claimed in claim 14, wherein the radio link control stage separately receives a first data flow belonging to a control plane, from which it forms the first data units, and at least one second data flow belonging to a user plane, from which it forms some at least of the second data units.

22. The access network as claimed in claim 21, wherein the information of the specified type comprises radio resource control information and/or mobility management information and/or call control information.

23. The access network as claimed in claim 14, wherein the radio link control stage receives a data flow belonging to a user plane, from which it forms the data units, while discriminating the first and second data units based on an analysis of said flow.

24. The access network as claimed in claim 23, wherein said data flow is composed of IP datagrams.

25. The access network as claimed in claim 24, wherein the analysis of the flow comprises an examination of a type of service field and/or of a type of protocol field included in a header of each IP datagram.

26. The access network as claimed in claim 24, wherein the analysis of the flow comprises an examination of a transport layer protocol header and/or of an application layer protocol header included in each IP datagram.

27. A radio communication terminal, comprising a radio link control stage, a medium access control stage, a coding and multiplexing stage and a radio transmission stage, wherein the radio link control stage has means for processing separately first data units containing information of a specified type and second data units not containing information of the specified type, wherein the medium access control stage has means for receiving said data units and means for delivering the first data units along a first dedicated transport channel and the second data units along at least one second dedicated transport channel, wherein the coding and multiplexing stage has means for receiving the data units delivered along said dedicated transport channels and means for forming at least one symbol stream pertaining to a dedicated physical channel and supplied to the radio transmission stage, and wherein the coding and multiplexing stage and/or the radio transmission stage are controlled to provide greater protection against noise along the first dedicated transport channel than along the second dedicated transport channel.

28. The radio communication terminal as claimed in claim 27, wherein the information of the specified type is information pertaining to a signaling protocol.

29. The radio communication terminal as claimed in claim 27, wherein the coding and multiplexing stage is controlled to apply a channel coding exhibiting a higher redundancy in the first dedicated transport channel than in the second dedicated transport channel.

30. The radio communication terminal as claimed in claim 27, wherein the coding and multiplexing stage is controlled to form a first symbol stream relating to a first dedicated physical channel based on the first dedicated transport channel, and at least one second symbol stream relating to a second dedicated physical channel based on at least one second dedicated transport channel.

31. The radio communication terminal as claimed in claim 30, wherein the radio transmission stage is so controlled that the transmitted radio signals have a first component along the first dedicated physical channel and a second component along the second dedicated physical channel, and that the first component has a greater transmission power than the second component.

32. The radio communication terminal as claimed in claim 30, wherein the dedicated physical channels are multiplexed by a spread spectrum technique, and wherein the coding and multiplexing stage and the radio transmission stage are so controlled that the first symbol stream has a smaller symbol bit rate than the second symbol stream, and that the first dedicated physical channel is associated with a higher spreading factor than the second dedicated physical channel.

33. The radio communication terminal as claimed in claim 30 wherein the radio signals are transmitted from at least two base stations, the radio transmission stage being apportioned among said base stations, and wherein the first and second symbol streams are supplied to the radio transmission stage in distinct base stations, so as to form radio signals transmitted along different propagation paths.

34. The radio communication terminal as claimed in claim 27, wherein the radio link control stage separately receives a first data flow belonging to a control plane, from which it forms the first data units, and at least one second data flow belonging to a user plane, from which it forms some at least of the second data units.

35. The radio communication terminal as claimed in claim 34, wherein the information of the specified type comprises radio resource control information and/or mobility management information and/or call control information.

36. The radio communication terminal as claimed in claim 27, wherein the radio link control stage receives a data flow belonging to a user plane, from which it forms the data units, while discriminating the first and second data units based on an analysis of said flow.

37. The radio communication terminal as claimed in claim 36, wherein said data flow is composed of IP datagrams.

38. The radio communication terminal as claimed in claim 37, wherein the analysis of the flow comprises an examination of a type of service field and/or of a type of protocol field included in a header of each IP datagram.

39. The radio communication terminal as claimed in claim 37, wherein the analysis of the flow comprises an examination of a transport layer protocol header and/or of an application layer protocol header included in each IP datagram.

* * * * *